United States Patent [19]

Hong et al.

[11] Patent Number: 4,664,168
[45] Date of Patent: May 12, 1987

[54] SELF-SEALING TIRE WITH EDGE STRIPS FOR TIRE SEALANT

[75] Inventors: Sung W. Hong, Cheshire; Phillip J. Cangelosi, Waterbury, both of Conn.

[73] Assignee: The Uniroyal Goodrich Tire Company, Akron, Ohio

[21] Appl. No.: 693,090

[22] Filed: Jan. 22, 1985

[51] Int. Cl.$^4$ .................. B60C 21/14; B60C 5/12
[52] U.S. Cl. ................................ 152/504; 152/510; 156/115
[58] Field of Search ................ 152/501–505, 152/506, 507, 510, 516, 521; 156/115

[56] References Cited

U.S. PATENT DOCUMENTS

| | | | |
|---|---|---|---|
| 1,325,465 | 12/1919 | Dickey | 156/115 |
| 1,774,892 | 11/1929 | Kline | 152/506 |
| 2,099,514 | 4/1935 | Eberhard | 154/14 |
| 2,342,580 | 2/1944 | Hartz | 154/15 |
| 2,877,819 | 3/1959 | Gibbs | 152/347 |
| 3,042,098 | 7/1962 | Reinowski et al. | 152/347 |
| 3,903,947 | 9/1975 | Emerson | 152/347 |
| 3,921,689 | 11/1975 | Caccia et al. | 152/502 |
| 3,935,893 | 2/1976 | Stang et al. | 152/347 |
| 3,952,787 | 4/1976 | Okado et al. | 152/347 |
| 3,981,342 | 9/1976 | Farber et al. | 152/346 |
| 4,037,636 | 7/1977 | Hagenbohmer et al. | 152/504 |
| 4,057,090 | 11/1977 | Hoshikawa et al. | 152/347 |
| 4,064,922 | 12/1977 | Farber et al. | 152/347 |
| 4,096,898 | 6/1978 | Messerly et al. | 152/330 L |
| 4,161,202 | 7/1979 | Powell et al. | 152/347 |
| 4,163,467 | 8/1979 | Dobson | 152/347 |
| 4,228,839 | 10/1980 | Böhm et al. | 152/347 |
| 4,256,158 | 3/1981 | Chautard et al. | 152/330 RF |
| 4,282,052 | 8/1981 | Dobson | 156/79 |
| 4,286,643 | 9/1981 | Chemizard et al. | 152/347 |
| 4,388,261 | 6/1983 | Codispoti et al. | 264/171 |

FOREIGN PATENT DOCUMENTS 0093611  6/1983  Japan ........................ 152/504

Primary Examiner—Donald E. Czaja
Assistant Examiner—Thomas Bokan
Attorney, Agent, or Firm—Harry F. Pepper, Jr.

[57] ABSTRACT

A self-sealing pneumatic tire that has an inner surface provided with a layer of sealant and a plurality of edge strips that partially overlap the sealant layer to retain the sealant in position during construction and operation of the tire. Construction is simplified by utilizing a laminate structure incorporating such edge strips and also comprising an air impermeable elastomer strip, the center of which is coated with a layer of puncture sealant material and having the edge strips adhesively attached to the elastomer strip and partially overlapping the edges of the sealant layer. Also, a method of constructing this tire by attaching a tire body or carcass to this laminate structure prior to molding and curing the tire. During the molding process, the edge strips that partially overlap the sealant layer hold the sealant in place preventing it from flowing in an uncontrolled manner.

13 Claims, 7 Drawing Figures

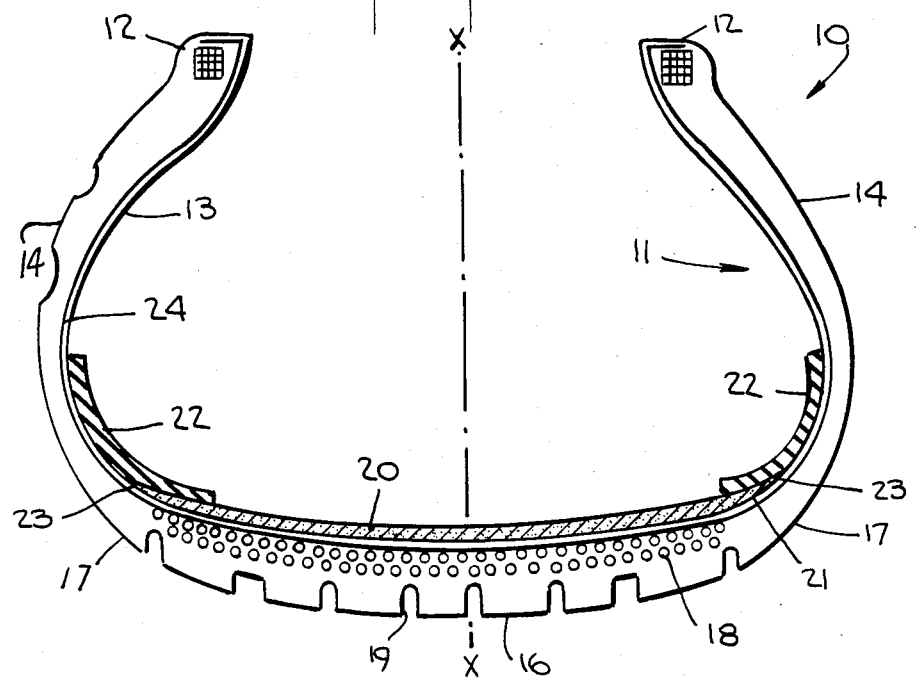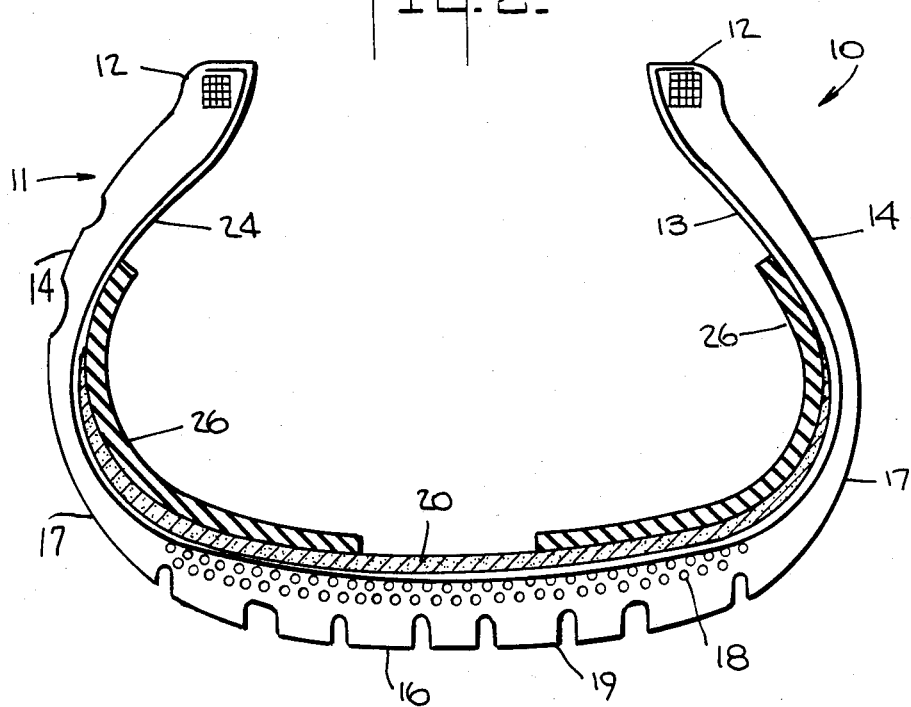

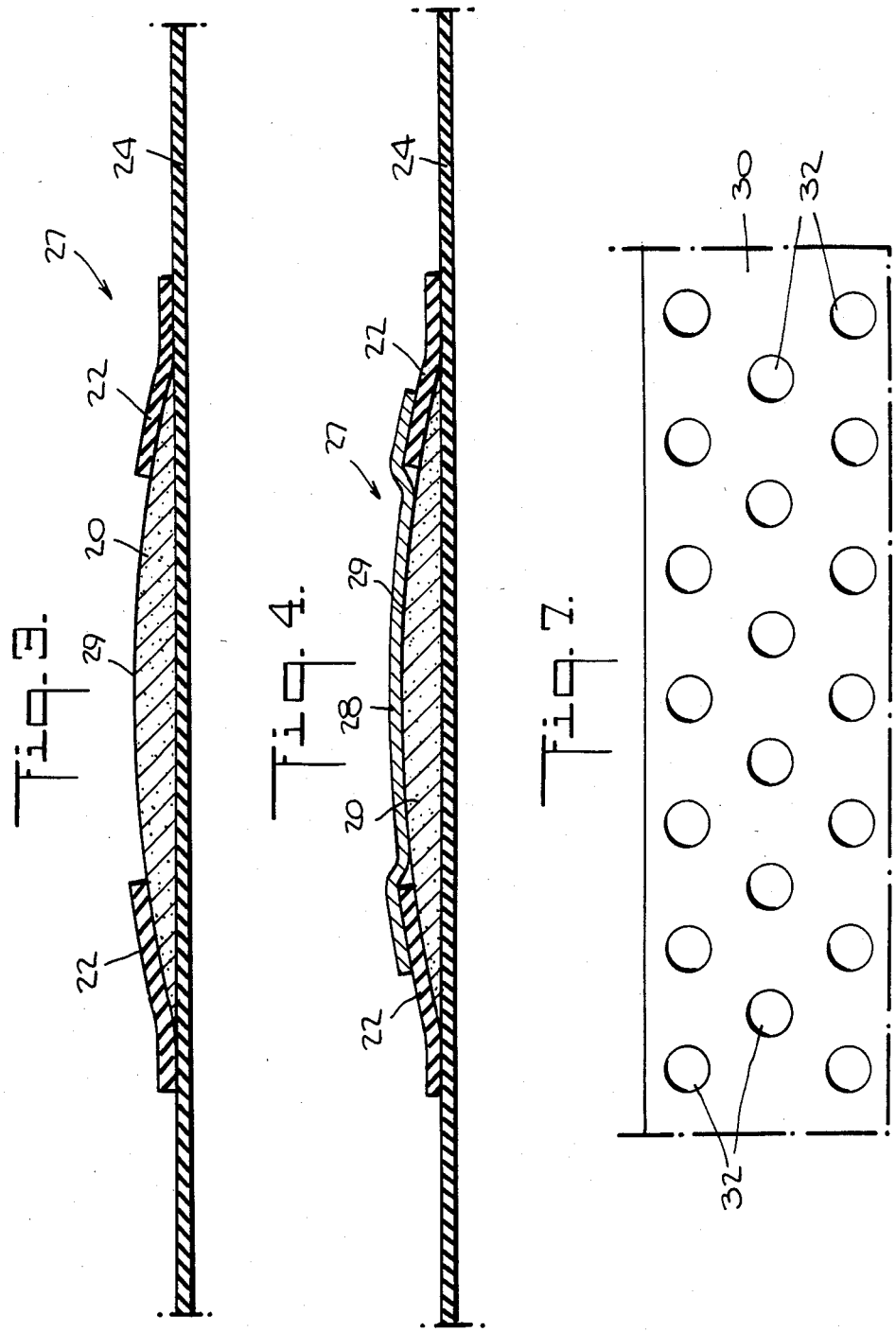

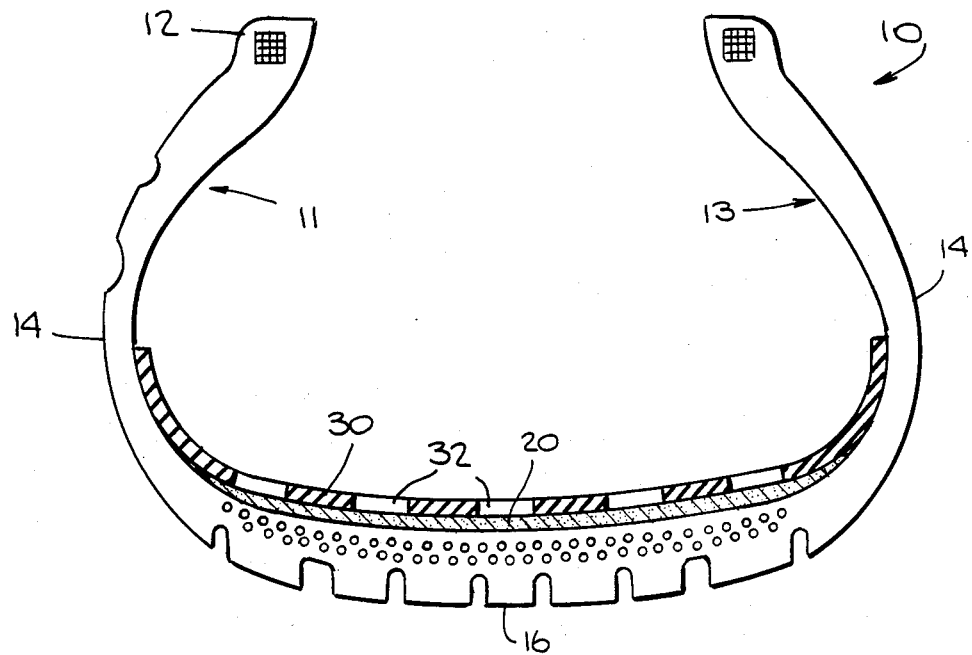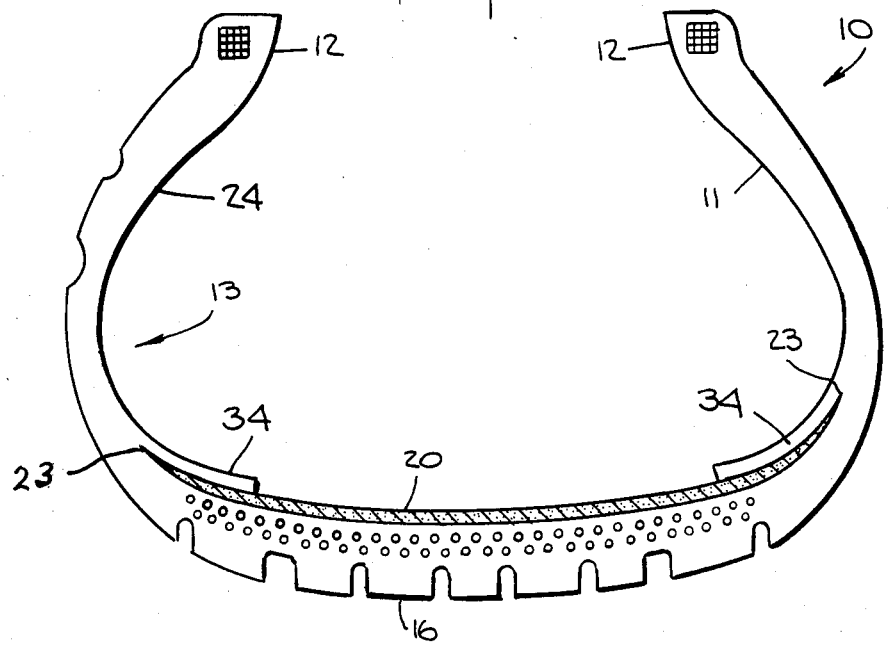

SELF-SEALING TIRE WITH EDGE STRIPS FOR TIRE SEALANT

This invention relates to pneumatic tires and more particularly to self-sealing pneumatic tires and methods of making such tires.

BACKGROUND OF THE INVENTION

Methods for preventing loss of air in tires, especially tubeless tires, are well known to those skilled in the art. For example, U.S. Pat. Nos. 3,935,893 (Stang et al), 3,952,787 (Okado et al) and 4,064,922 (Farber et al) all disclose self-sealing tires and are representative of the state of the art. These disclosures generally use sealants that are semi-cured elastomeric materials having a certain degree of adhesion to the inside of a tire carcass or its air impermeability-enhancing layer. Various materials have been used in the past with varying degrees of success.

It has been found that when sealant is applied to the tire carcass prior to curing the tire, the sealant has a tendency to flow irregularly away from the application area of the tread and buttress. An additional problem is encountered in trying to prevent the tire from sticking to the molding equipment during molding of the tire because of the inherent tackiness of the sealant. Problems of this nature are often exaggerated due to the high temperatures used in the molding process. For these reasons, sealants are usually applied to the tire carcass after the tire itself has been formed and cured. However, this mode of operation requires additional steps that are both costly and waste energy. These steps include scrubbing and cleaning the inside of the tire carcass with a solvent or soap and water (see for example U.S. Pat. No. 3,935,893, column 4, lines 44–57). After cleaning, sealant may then be applied to the inside of the tire carcass and exposed to normal curing conditions (see also column 4, line 58 through column 5, line 23 of U.S. Pat. No. 3,935,893).

While prior art designs generally involve costly additional steps required during manufacture of self-sealing tires, there can also be difficulties involved with operation of such tires. When self-sealing tires are rotated at high speed, sealant can tend to flow towards the center portion of the tire away from buttress areas due to centrifugal forces. This can reduce protection of buttress areas against punctures.

In general, the prior art discloses self-sealing pneumatic tire constructions wherein the layer of sealant material is covered with a layer of impermeable material for the purpose of holding the sealant material in place during operation of the tire itself. An example of such a structure is U.S. Pat. No. 3,981,342 which discloses in FIG. 4 a layer of sealant material covered by a liner 25.

The disadvantage of this type of construction is that the sealant and air impermeable material holding the sealant in place must be adhered to the tire in a separate operation after the tire is molded and cured. This is because the sealant releases gases and expands when exposed to the high temperatures of tire molding and curing processes. This expansion and the gases will cause the impermeable material to blister and break leaving the sealant improperly distributed inside the tire.

Alternatively, a layer of sealing material can be applied to the tire carcass without any covering and this is disclosed in the above patent in FIG. 1. However, if the sealant is applied in this form, it is not held in position and will tend to flow as discussed above. Also, the sealant must be applied, again, after the tire has been molded and cured because the sealant would stick to tire building drums and other equipment during the steps of building the tire.

SUMMARY OF THE INVENTION

It is, therefore, an object of the present invention to provide an improved self-sealing pneumatic tire with a layer of sealant material that can be integrated into the tire structure prior to molding and curing of the tire.

It is another object of the present invention to provide an improved self-sealing pneumatic tire with a layer of sealant material that dioes not flow away from the tire tread and buttress region during operation of the tire.

It is another object of the present invention to provide a method for making a self-sealing pneumatic tire whereby a layer of sealant material is integrated into the tire structure prior to molding and curing of the tire and whereby the sealant material is maintained in proper position during the molding process.

It is another object of the present invention to provide a method for constructing a self-sealing pneumatic tire utilizing fewer steps in the construction process and thereby reducing the cost of making such a tire.

Finally, it is another object of the present invention to provide a method of treating a layer of exposed tire sealant material to permit the sealant layer to remain exposed during tire building operations.

In general, the objectives of the invention are accomplished by the provision of a self-sealing tubeless pneumatic tire that has a tire body or carcass that is constructed upon a laminate structure comprising an air impermeable liner or elastomer strip, the center of which is coated with a layer of puncture sealant material. To hold the sealant in place, the laminate stucture is provided with a flow barrier in the form of edge strips adhesively attached radially inwardly to the elastomer strip and partially radially inwardly overlapping the edges of the sealant layer.

In the method of constructing the present invention, a tire body or carcass is fomed over this laminate structure prior to molding and curing the tire. During the molding process, the edge strips that partially overlap the sealant layer hold the sealant in place preventing it from flowing in an uncontrolled manner. Additionally, one or more steps are undertaken to render the exposed surface of the sealant layer non-tacky, such as modifying a thin surface layer of the exposed portion of the sealant, applying a thin film of a release agent, or covering the sealant layer with a permanent layer of elastomeric material in perforated form if the material is impermeable. The laminate structure is positioned on a tire building drum such that the elastomer strip can serve as an inner liner for the tire carcass. The individual layers of the tire carcass are then built upon the laminate structure. After the carcass is formed and a tread portion is attached, the tire body is molded and cured to form a finished tire.

BRIEF DESCRIPTION OF THE DRAWINGS

The foregoing and other objects and features of the present invention will be more clearly understood from the following detailed description thereof when read in conjunction with the accommpanying drawings in which:

FIG. 1 is a cross-sectional elevation view of a self-sealing pneumatic tire in accordance with this invention;

FIG. 2 is a cross-sectional elevation view of another embodiment of a self-sealing pneumatic tire in accordance with the present invention;

FIG. 3 is a cross-sectional elevation view of a laminate structure in accordance with the present invention;

FIG. 4 is a cross-sectional elevation view of an alternate embodiment of the laminate structure of the present invention;

FIG. 5 is a cross-sectional elevation view of an alternate embodiment of the present invention that is provided with a perforated covering over a sealant layer;

FIG. 6 is a cross-sectional elevation view of an alternate embodiment of the present invention;

FIG. 7 is a fragmentary plan view of the perforated covering of FIG. 5.

DESCRIPTION OF THE PREFERRED EMBODIMENT

Referring now to FIG. 1, there is illustrated a tubeless tire 10 constructed in accordance with the subject invention. The tire 10 includes a tire carcass 11 which might be composed of radial or substantially radial superimposed carcass plys of conventional form. The carcass 11 terminates at its innermost edges in a pair of beads 12. The lateral regions of the carcass form sidewall regions 14 which generally form or define the maximum width of the tire 10. A tread region 16 forms a crown region of the carcass 11 and pair of buttress regions 17 are positioned between and connect the tread 16 and sidewalls 14. In the interior of the tread region 16, there are generally found one or more belts 18 that are provided to enhance the performance and durability of the tire 10. The surface region of the tread 16 forms a tread pattern 19. The inner surface 13 of the tire is generally covered by an air impermeable liner 24 made of, for example, butyl rubber.

The cord ply components of the tire 10 are usually made of layers of rubberized cords or cables made of any suitable natural or synthetic fiber such as nylon, rayon, polyester, metal wire, glass fiber, etc., and each of the plys of the carcass 11 extends from bead 12 to bead 12. The belts 18 can also be made of any of several materials, including glass fiber, aromatic polyamide, metal or rayon.

The description thus far is basically conventional and generally in accordance with the current state of the art.

The tire 10 that is shown in FIG. 1 is of the self-sealing variety. The mid-equatorial plane of the tire is indicated by a dashed line x—x. A continuous layer or strip of puncture sealant material 20 is provided on the inside of the tire. Typically, self-sealing tires have been formed with a sealant layer applied to the liner on a tubeless tire's inner surface 13. This sealant material will have plastic and adhesive qualities such that the sealant composition tends to stick to a puncturing object and, when the puncturing object is withdrawn, tends to be drawn into the opening or puncture, forming a plug which seals the opening against loss of air from the tires. It is important that the sealant 20 be provided opposite the tread region 16 of the tire 10 and extend radially inwardly along the buttress regions 17 as well. This location of the sealant layer 20 provides maximum protection in the region of the tire 10 most vulnerable to puncture by foreign objects. It is very important that the sealant 20 be maintained in this location during construction and operation of the tire 10. Because the sealant has certain plastic flow characteristics, the sealant has a tendency to flow along the inner surface of the tire 10 and can easily be displaced particularly under elevated temperatures or while the tire is in motion during operation.

A sealant retainer shown in the form of edge strip members 22 is provided within the tire 10 for the purpose of maintaining the sealant 20 in its proper location within the tire both during construction of the tire and during operation of the tire. To accomplish this function, the sealant retainer or edge strips act as a flow barrier to provide sealant flow retention during curing and operation of the tire. The edge strips 22 generally extend from the tire sidewall region 14 across the tire buttress regions 17 to outer edges of the tire tread region 16. The edge strips 22 are carried by the tire's inner surface 13 and are adhered or attached either directly or indirectly to the tire carcass 11 in the region of the sidewalls 14.

To explain in greater detail, the edge strips 22 extend along the inner surface 13 of the tire and cover the outermost boundaries 23 of the sealant layer 20. From the sealant layer boundaries 23, the edge strips 22 continue to extend towards the center of the tread 16 and thereby overlap edge portions 21 of the sealant 20. The width of the edge strips 22 and the amount or percent of sealant 20 that is overlapped and, additionally, the amount or percent of tire carcass 11 to which the edge strips are attached directly or indirectly can be varied within certain limits. What is important, is to locate the edge strips 22 in such a manner that the sealant 20 is maintained in its proper location during construction and operation of the tire 10.

In the tire as shown in FIG. 1, the edge strips 22 and the sealant 20 are attached to a liner 24 that extends from bead 12 to bead 12. The liner, in turn, forms a base upon which is attached or adhered a tire carcass 11. The liner 24, in the form of an air impermeable elastomer strip, is generally used on conventional tires to replace the function of an inner tube in a typical tire. The liner is usually comprised of a substance such as butyl rubber. The tire carcass 11 and liner 24 are adhered to each other to form an integral structure and the liner is generally considered to be a part of the carcass structure.

The width of the edge strips 22 will depend a great deal on the size of the tire and the width and thickness of the sealant 20 applied. Generally, the edge strip width is between 0.5 and 5.0 inches (1.27–12.7 cm.), preferably 1-3 inches (2.54–7.62 cm.), and in the most preferred form is between 1.5 and 2.5 inches (3.81–6.35 cm.). The thickness of the edge strips 22 may vary between 1/64 to ¼ inches (0.04–0.64 cm.), preferably 1/64 to ⅛ inches (0.04 to 0.32 cm.) and in the most preferred form is between 1/32 and ⅛ inches (0.079 to 0.32 cm.). Each edge strip 22 will overlap the sealant 20 in cross-sectional length, a distance of between 0.125 and 3.5 inches (0.64–8.9 cm.). The overlap is preferably 0.25 to 2.5 inches (1.27–6.35 cm.), and in the most prefered form is between 0.5 and 1.5 inches (1.27–3.84 cm.). The edge strips 22 should be adhesively attached to the tire liner 24 to provide proper attachment and the cross-sectional length of this attachment may be between 0.25 and 4.75 inches (0.64–12.1 cm.), preferably between 0.5 and 2.5 inches (1.27–6.35 cm.) and in the most preferred form is between 1 and 2 inches (2.54–5.1 cm.).

Some of the dimensional relationships can be expressed in terms of relative percentages. Generally, the puncture sealant 20 will be disposed over between 20 percent and 80 percent of the elastomer strip 24 and preferably between 30 and 60 percent of the elastomer strip.

The edge strips 22 will generally be adhered to between 2 and 50 percent of the elastomer strip 24, preferably between 5 and 40 percent and most preferably between 10 percent and 30 percent of the elastomer strip.

Additionally, the edge strips 22 cover radially inwardly (in total, including both edge strips) between 5 percent and 60 percent of the puncture sealant layer 20, preferably between 10 percent and 30 percent and most preferably between 10 and 20 percent of the sealant layer 20.

Referring now to FIG. 2, an alternate embodiment of the subject invention is shown in which the dimensions of the tire sealant 20 and tire edge strips are varied significantly. The configuration shown in FIG. 2 may be desirable for the purpose of giving greater protection to the tire buttress regions 17. This additional protection is provided by extending the width of the sealant 20 along the tire buttress region 17 and even into the tire sidewall regions 14. The increased width of the tire sealant layer or strip 20 creates a need for wide edge strips 26 that are greater in width than the edge strips 22 shown located along the buttress regions of the tire in FIG. 1. The wide edge strips 26 extend from regions of the tire sidewall 14 not very distant from the tire beads 12 and continue along the inner surface 13 of the tire 10 to a central region of the tire tread 16. The increased width of the wide edge strips 26 is useful in order to maintain proper location of the tire sealant 20 during construction of the tire 10 and during operation of the tire.

METHOD OF CONSTRUCTION

Referring now to FIG. 3, there is shown a laminate structure 27 constructed in accordance with the subject invention. This laminate structure 27 can be useful in the construction of a tire 10 incorporating the features of the present invention and will also enhance the ability of the sealant retainer to maintain the sealant 20 in its proper location during operation of the tire 10.

The laminate structure 27 is comprised of a conventional air impermeable elastomer strip or liner 24 that would correspond to the liner shown in FIG. 1 or 2. The liner 24 is a strip of air impermeable material (e.g., butyl rubber) that becomes the inner surface of a tire during the early stages of construction of that tire. A suitable sealant material 20, for example, the sealant described in the aforementioned U.S. Pat. No. 4,064,922 or U.S. Pat. No. 3,981,342, is applied to a center portion of the liner 24. The sealant 20 forms a strip or layer of material usually centrally located on the liner 24 and parallel to the liner strip 24. It is anticipated that the layer of sealant 20 might be extruded onto the liner although certainly other methods might be employed.

After the sealant 20 has been disposed on the liner 24, sealant retainer in the form of edge strips 22 are applied, overlapping portions of the sealant 20, and the remaining portions of the edge strips 22 are adhered directly to the liner 24. The edge strips 22 are generally applied parallel to the strip of sealant material and the liner 24.

The completed laminate structure 27 forms a conveniently handled subassembly that can be readily and easily integrated into conventional tire structures and construction procedures. In addition to forming a conveniently handled subassembly, the laminate structure also prelocates the sealant material 20 in the proper location on the liner 24. When the tire carcass is properly constructed over the liner 24, using the laminate structure as a base, the sealant is already in place, properly positioned on the inner surface of the tire.

Attaching or adhering the inner layers of a tire carcass to the laminate structure 27 can be accomplished by essentially the same method as if the carcass were constructed upon a liner only.

The laminate structure 27 is applied to or wrapped around a conventional tire building drum with the side of the laminate structure upon which the sealant is located in contact with the drum. One example of such a tire building drum is described in U.S. Pat. No. 3,489,634. After the laminate structure 27 has been correctly positioned on such a drum, the separate layer of a carcass 11 and then beads 12 are added over the laminate structure. The laminate structure 27 and layers of tire carcass are adhered to each other to form an integral structure. Thereafter, if a single stage building process is employed, a belt 18 and tread assembly is added to the carcass 11, and the resulting tire structure is then placed in a vulcanization press for shaping and curing to form a finished tire.

In a two stage process, the tire, comprised of a laminate structure and carcass, is transferred to a shaping mechanism for pre-shaping the carcass into a toroid and to its approximate final diameter. A belt and tread assembly is then added, and the raw tire is then transferred to a vulcanization press for final shaping and curing.

In the shaping and curing step a complete tire 10 including the sealant layer 20 is formed with the sealant held in place by the edge strips 22. After the tire is formed, there is no need for a follow-on step of applying sealant because it is already in place.

Before the laminate structure 27 is wrapped around the tire building drum it is usually necessary to take specific measures to prevent sticking of the sealant 20 to the tire building drum and other equipment used in the tire building process. One way to achieve this is to cover the sealant 20 with a thin film of release agent such as polyvinylalcohol or sodium silicate. The film material can be applied as a spray in an aqueous solution from which water evaporates leaving the sealant surface non-tacky. Various other steps that can be taken to accomplish this purpose include (a) covering the sealant 20 with a solid release agent in the form of a dust such as talc or zinc stearate, (b) applying other liquid release agents such as silicones or fluorocarbons, (c) covering the entire sealant surface with a perforated layer of impermeable material or, finally, (d) forming a thin non-tacky surface layer of the sealant with, for example, light-catalyzed oxidation or chemically induced modification. Whatever is used, and other methods will probably be developed, it is important that the sealant surface be permitted to expand uniformly, and the treatment to eliminate tack must contribute little or no resistance to this expansion.

Referring to FIG. 4, there is shown a thin layer or coating 28 of air permeable material covering a formerly exposed surface 29 of sealant material 20. It is highly desirable that the coating be air permeable to permit residual air or vapor in the sealant to escape. If this is not permitted to occur, bubbles or blisters will form during tire molding and curing procedures which cause delaminations that can detrimentally affect the construction and operational characteristics of the tire 10. This thin coating of air permeable material can be made of any of several chemical compositions. A thin film of polyvinylalcohol using a 5% (weight) aqueous solution and letting the water evaporate is one alternative. Other air permeable materials should be quite satisfactory. In FIG. 4, the thin layer is shown overlapping the edge strips 22. This is not generally considered to be necessary and the air permeable material boundary might be deployed over the sealant only.

The light-catalyzed oxidation step to form a thin, non-tacky, surface layer of the sealant might prove to be the least costly of the above-listed alternatives. One inherent advantage is that there is no need for the extra step of applying a film of additional material. This method might be particularly successful if the laminate structure 27 is constructed a specified period in advance of the overall tire, and if the thin surface layer of the exposed surface 29 of sealant 20 is modified during that specified period and thereby renders the exposed surface non-tacky. Such surface treatment can be accomplished by aging the sealant 20 in the laminate structure 27 for specific periods of time. The actual time requirement is subject to the sealant composition, light source (frequencies and intensities), temperature, and oxygen availability (concentration and pressure). Under normal room conditions (in air at one (1) atmosphere), 4 to 10 days would be required at 75° F. (24° C.), if ordinary flourescent light is utilized. It is anticipated that catalyzed oxidation of a thin surface layer might also be chemically induced.

ALTERNATE EMBODIMENTS

Referring now to FIGS. 5 and 7, there is shown an alternate embodiment of the subject invention. It may be desirable to alter the form of the sealant retainer or edge strips as described thus far while still accomplishing the primary purpose of the edge strips. A perforated impermeable covering or strip 30 is illustrated in FIGS. 5 and 7, which can be laid over portions of the sealant 20 or might also be laid over the entire formerly exposed surface of sealant 20. As shown in FIG. 5, this perforated strip 30 would be adhered or attached to the liner 24 which is, in turn, attached or adhered to the tire carcass 11. The perforated covering or strip 30 as shown in FIG. 5 extends from sidewall to sidewall 14 on the tire 10. Individual vent holes 32 in the form of simple perforations are interspersed over the region of the perforated strip 30 that covers the sealant layer 20. The vent holes 32 permit portions of the sealant 20 to be directly exposed. However, the non-perforated portions of the perforated strip 30 act to retain the sealant 20 in place during construction and operation of the tire 10 and space the sealant from the tire building drum and from the inflation diaphram of the vulcanization press during building of the tire. With this type of covering, it is unnecessary to render the surface of the sealant 20 non-tacky because the perforated strip 30 separates the sealant from the tire building equipment.

It is very important that portions of the sealant material 20 be exposed during the construction and curing processes in order to allow residual air or vapor in the sealant to escape when an impermeable sealant cover is used. Again, if residual air or vapor is not permitted to escape, bubbles or blisters will form during tire molding and curing procedures which can detrimentally affect the tire 10, as noted earlier.

Referring to FIG. 6, another alternate embodiment is shown of the subject invention. This particular tire 10 utilizes the tire carcass 11 and liners that are a part of the carcass to integrally form edge strips or liner overlaps 34. The portion of the carcass that is used might be the impermeable elastomer liner strip 24 that covers the inner surface 13 of the tire from the beads 12 up to the boundaries 23 of the sealant layer 20. From the sealant layer boundaries 23, the liner overlaps 34 extend a sufficient distance toward the center of the tire tread region 16 to retain the sealant 20 in position.

The invention as described above is a tire construction and method of construction that fully satisfies the objects, aims and advantages previously set forth. It will be understood that the foregoing description of preferred embodiments of the subject invention is for purposes of illustration only, and that the various structural and operational features that are herein disclosed are susceptible to a number of modifications and changes, none of which will depart from the spirit and scope of the subject invention as defined in the appended claims.

What is claimed is:

1. A self-sealing tubeless pneumatic tire with an inner surface and a puncture sealant layer disposed radially inwardly on at least a portion of said inner surface, said tire being provided with sealant retainer edge strips adhesively adhered to said inner surface and radially inwardly overlying at least edge portions of said sealant layer but leaving at least a portion of said sealant layer exposed within said tire, wherein said sealant layer is generally disposed continuously from one buttress region to an opposite buttress region of said tire and wherein said sealant layer is retained in position by said sealant retainer edge strips located along the buttress regions of the tire.

2. The tire recited in claim 1 wherein a portion of each of said edge strips is adhered to a tire sidewall region and the remaining portion of each of said edge strips covers a portion of said sealant layer.

3. The tire recited in claim 2 wherein said sealant retainer liner comprises two edge strips, one of said edge strips located along said inner surface of said tire at a sidewall and buttress region and the other of said edge strips located along said inner surface of said tire at an opposite sidewall and buttress region.

4. The tire recited in claim 3 having a tread region wherein said sealant layer is located on said inner surface of said tire in the tread and buttress region and wherein each of said edge strips is a single strip extending circumferentially around a corresponding sidewall and buttress region of the inner surface of said tire and partially overlaping said sealant layer.

5. A self-sealing tubeless pneumatic tire including a tire carcass, an inner surface and tread region, wherein said inner surface is comprised of a laminate structure adhered to said tire carcass from bead to bead within said tire, said laminate structure comprising:
 a. an air impermeable elastomer strip that forms a liner on the inside of said tire;
 b. a layer of puncture sealant disposed radially inwardly on said elastomer strip along the tread region of said tire and disposed continuously from one buttress region to an opposite buttress region; and
 c. sealant retainer edge strips adhesively attached to said elastomer strip and partially radially inwardly overlapping edge portions of said sealant layer but leaving at least a portion of said sealant layer exposed within said tire, and wherein said puncture sealant layer, said elastomer strip and said edge strips are all disposed parallel to each other and said puncture sealant layer covers between 30 and 60 percent of said elastomer strip and said edge strips are adhered to between 5 and 40 percent of said elastomer strip and said overlapping being between 10 percent and 30 percent of said puncture sealant lauyer.

6. A self-sealing tubeless pneumatic tire including a tire carcass, an inner surface and a tread region, wherein said inner surface is comprised of a laminate structure forming a strip disposed circumferentially within said tire, said laminate structure comprising:
 a. an air impermeable elastomer strip adhered to said tire carcass and forming a liner on the inside of said tre;
 b. a layer of puncture sealant, disposed as a continuous strip centrally positioned radially inwardly on said elastomer strip and parallel thereto, wherein:
  (i) said puncture sealant layer covers between 30 and 60 percent of said elastomer strip;
  (ii) said puncture sealant layer is generally between 0.2 centimeters and 2.0 centimeters thick;
 c. two sealant retainer edge strips disposed parallel to said elastomer strip and adhesively adhered thereto and wherein:
  (i) each of said sealant retainer edge strips is adhered to between 10 percent and 30 percent of said elastomer strip;
  (ii) each of said sealant retainer edge strips radiall inwardly overlaps a portion of said puncture sealant layer and covers radially inwardly between 10 percent and 20 percent thereof; and
  (iii) each of said sealant retainer edge strips is between 1/32 and ⅛ inch thick.

7. The pneumatic tire recited in claim 6 wherein said puncture sealant layer is provided with a surface layer of air permeable material for the purpose of rendering said surface non-tacky.

8. The tire recited in claim 6 wherein said puncture sealant layer has an exposed thin surface layer which has been subjected to modification to render said thin surface layer non-tacky.

9. The tire recited in claim 8 wherein said exposed thin surface layer has been subjected to light catalyzed oxidation.

10. The tire recited in claim 8 wherein said exposed thin surface layer has been subjected to chemically-induced modification.

11. The tire recited in claim 7 wherein said air permeable material is a releasing agent that is non-detrimental to curing of said tire.

12. The tire recited in claim 7 wherein said air permeable material is a thin film of a dusting agent.

13. The tire recited in claim 7 wherein said air permeable material is a thin film of a liquid release agent.

* * * * *